(12) United States Patent
Serebryakov et al.

(10) Patent No.: US 11,948,550 B2
(45) Date of Patent: Apr. 2, 2024

(54) REAL-TIME ACCENT CONVERSION MODEL

(71) Applicant: Sanas.ai Inc., Pleasanton, CA (US)

(72) Inventors: Maxim Serebryakov, Palo Alto, CA (US); Shawn Zhang, Pleasanton, CA (US)

(73) Assignee: SANAS.AI INC., Pleasanton, CA (US)

( * ) Notice: Subject to any disclaimer, the term of this patent is extended or adjusted under 35 U.S.C. 154(b) by 0 days.

(21) Appl. No.: 17/460,145

(22) Filed: Aug. 27, 2021

(65) Prior Publication Data
US 2022/0358903 A1 Nov. 10, 2022

Related U.S. Application Data

(60) Provisional application No. 63/185,345, filed on May 6, 2021.

(51) Int. Cl.
*G10L 13/02* (2013.01)
*G06N 20/20* (2019.01)
(Continued)

(52) U.S. Cl.
CPC .............. *G10L 13/02* (2013.01); *G06N 20/20* (2019.01); *G10L 15/02* (2013.01); *G10L 25/27* (2013.01); *G10L 2015/022* (2013.01)

(58) Field of Classification Search
CPC ................................ G10L 13/02; G10L 15/02
See application file for complete search history.

(56) References Cited

U.S. PATENT DOCUMENTS 10,163,451 B2  12/2018  Dirac et al.
10,614,826 B2   4/2020  Huffman et al.
(Continued)

FOREIGN PATENT DOCUMENTS

CN  111462769 A  7/2020
CN  112382267 A  2/2021
(Continued)

OTHER PUBLICATIONS

Sajjan, S. C., & Vijaya, C. (Mar. 2016). Continuous Speech Recognition of Kannada language using triphone modeling. In 2016 International Conference on Wireless Communications, Signal Processing and Networking (WiSPNET) (pp. 451-455). IEEE.*

(Continued)

*Primary Examiner* — Bryan S Blankenagel

(74) *Attorney, Agent, or Firm* — Troutman Pepper Hamilton Sanders LLP

(57) ABSTRACT

Techniques for real-time accent conversion are described herein. An example computing device receives an indication of a first accent and a second accent. The computing device further receives, via at least one microphone, speech content having the first accent. The computing device is configured to derive, using a first machine-learning algorithm trained with audio data including the first accent, a linguistic representation of the received speech content having the first accent. The computing device is configured to, based on the derived linguistic representation of the received speech content having the first accent, synthesize, using a second machine learning-algorithm trained with (i) audio data comprising the first accent and (ii) audio data including the second accent, audio data representative of the received speech content having the second accent. The computing device is configured to convert the synthesized audio data into a synthesized version of the received speech content having the second accent.

22 Claims, 4 Drawing Sheets

(51) Int. Cl.
*G10L 15/02* (2006.01)
*G10L 25/27* (2013.01)

(56) References Cited

U.S. PATENT DOCUMENTS

| | | | | |
|---|---|---|---|---|
| 11,361,753 B2* | 6/2022 | Pan | ............ | G10L 13/10 |
| 2003/0018473 A1* | 1/2003 | Ohnishi | ............ | G10L 13/10 |
| | | | | 704/258 |
| 2006/0129399 A1* | 6/2006 | Turk | ............ | G10L 21/00 |
| | | | | 704/E21.001 |
| 2008/0133241 A1* | 6/2008 | Baker | ............ | G10L 19/0018 |
| | | | | 704/260 |
| 2009/0204395 A1* | 8/2009 | Kato | ............ | G10L 13/033 |
| | | | | 704/E11.001 |
| 2010/0211376 A1* | 8/2010 | Chen | ............ | G10L 15/187 |
| | | | | 704/250 |
| 2014/0258462 A1* | 9/2014 | Hwang | ............ | G06Q 30/0621 |
| | | | | 709/219 |
| 2014/0365216 A1* | 12/2014 | Gruber | ............ | G10L 13/04 |
| | | | | 704/235 |
| 2015/0170642 A1* | 6/2015 | Peng | ............ | G10L 15/187 |
| | | | | 704/235 |
| 2016/0203827 A1* | 7/2016 | Leff | ............ | G06T 13/40 |
| | | | | 704/207 |
| 2020/0169591 A1* | 5/2020 | Ingel | ............ | G10L 13/08 |
| 2021/0074264 A1* | 3/2021 | Liang | ............ | G06N 20/00 |
| 2022/0122579 A1* | 4/2022 | Biadsy | ............ | G10L 21/003 |
| 2022/0148562 A1* | 5/2022 | Park | ............ | G10L 13/047 |
| 2022/0180762 A1* | 6/2022 | Lurie | ............ | G10L 15/22 |
| 2022/0301542 A1* | 9/2022 | Sung | ............ | G10L 13/02 |

FOREIGN PATENT DOCUMENTS

| | | |
|---|---|---|
| CN | 112382270 A | 2/2021 |
| JP | 2005234418 A | 9/2005 |

OTHER PUBLICATIONS

Zhao, G., Ding, S., & Gutierrez-Osuna, R. (2019). Foreign Accent Conversion by Synthesizing Speech from Phonetic Posteriorgrams. In InterSpeech (pp. 2843-2847).*

Zheng, D. C. (2011). Accent Conversion via Formant-based Spectral Mapping and Pitch Contour Modification.*

International Searching Authority, PCT International Search Report and Written Opinion, PCT International Application No. PCT/US2022/028156, dated Aug. 17, 2022, 8 pages.

* cited by examiner

REAL-TIME ACCENT CONVERSION MODEL

CROSS-REFERENCE TO RELATED APPLICATIONS

This application claims the benefit of priority under 35 U.S.C. § 119 to U.S. Provisional Patent App. No. 63/185,345, filed on May 6, 2021, which is incorporated herein by reference in its entirety.

BACKGROUND

Software applications are used on a regular basis to facilitate communication between users. As some examples, software applications can facilitate text-based communications such as email and other chatting/messaging platforms. Software applications can also facilitate audio and/or video-based communication platforms. Many other types of software applications for facilitating communications between users exist.

Software applications are increasingly being relied on for communications in both personal and professional capacities. It is therefore desirable for software applications to provide sophisticated features and tools which can enhance a user's ability to communicate with others and thereby improve the overall user experience. Thus, any tool that can improve a user's ability to communicate with others is desirable.

OVERVIEW

One of the oldest communication challenges faced by people around the world is the barrier presented by different languages. Further, even among speakers of the same language, accents can sometimes present a communication barrier that is nearly as difficult to overcome as if the speakers were speaking different languages. For instance, a person who speaks English with a German accent may have difficulty understanding a person who speaks English with a Scottish accent.

Today, there are relatively few software-based solutions that attempt to address the problem of accent conversion between speakers of the same language. One type of approach that has been proposed involves using voice conversion methods that attempt to adjust the audio characteristics (e.g., pitch, intonation, melody, stress) of a first speaker's voice to more closely resemble the audio characteristics of a second speaker's voice. However, this type of approach does not account for the different pronunciations of certain sounds that are inherent to a given accent, and therefore these aspects of the accent remain in the output speech. For example, many accents of the English language, such as Indian English and Irish English do not pronounce the phoneme for the digraph "th" found in Standard American English (SAE), instead replacing it with a "d" or "t" sound (sometimes referred to as th-stopping). Accordingly, a voice conversion model that only adjusts the audio characteristics of input speech does not address these types of differences.

Some other approaches have involved a speech-to-text (STT) conversion of input speech as a midpoint, followed by a text-to-speech (TTS) conversion to generate the output audio content. However, this type of STT-TTS approach cannot capture many of the nuances of input speech that can provide information beyond the meaning of the words themselves, such as the prosody or emotion of the speaker. Further, a STT-TTS approach generally involves a degree of latency (e.g., up to several seconds) that makes it impractical for use in real-time communication scenarios such as an ongoing conversation (e.g., a phone call).

To address these and other problems with existing solutions for performing accent conversion, disclosed herein is new software technology that utilizes machine-learning models to receive input speech in a first accent and then output a synthesized version of the input speech in a second accent, all with very low latency (e.g., 300 milliseconds or less). In this way, accent conversion may be performed by a computing device in real time, allowing two users to verbally communicate more effectively in situations where their different accents would have otherwise made such communication difficult.

Accordingly, in one aspect, disclosed herein is a method that involves a computing device (i) receiving an indication of a first accent, (ii) receiving, via at least one microphone, speech content having the first accent, (iii) receiving an indication of a second accent, (iv) deriving, using a first machine-learning algorithm trained with audio data comprising the first accent, a linguistic representation of the received speech content having the first accent, (v) based on the derived linguistic representation of the received speech content having the first accent, synthesizing, using a second machine learning-algorithm trained with (a) audio data comprising the first accent and (b) audio data comprising the second accent, audio data representative of the received speech content having the second accent, and (vi) converting the synthesized audio data into a synthesized version of the received speech content having the second accent.

In another aspect, disclosed herein is a computing device that includes at least one processor, a communication interface, a non-transitory computer-readable medium, and program instructions stored on the non-transitory computer-readable medium that are executable by the at least one processor to cause the computing device to carry out the functions disclosed herein, including but not limited to the functions of the foregoing method.

In yet another aspect, disclosed herein is a non-transitory computer-readable storage medium provisioned with software that is executable to cause a computing device to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure refers to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Computing Device

Figure 1:
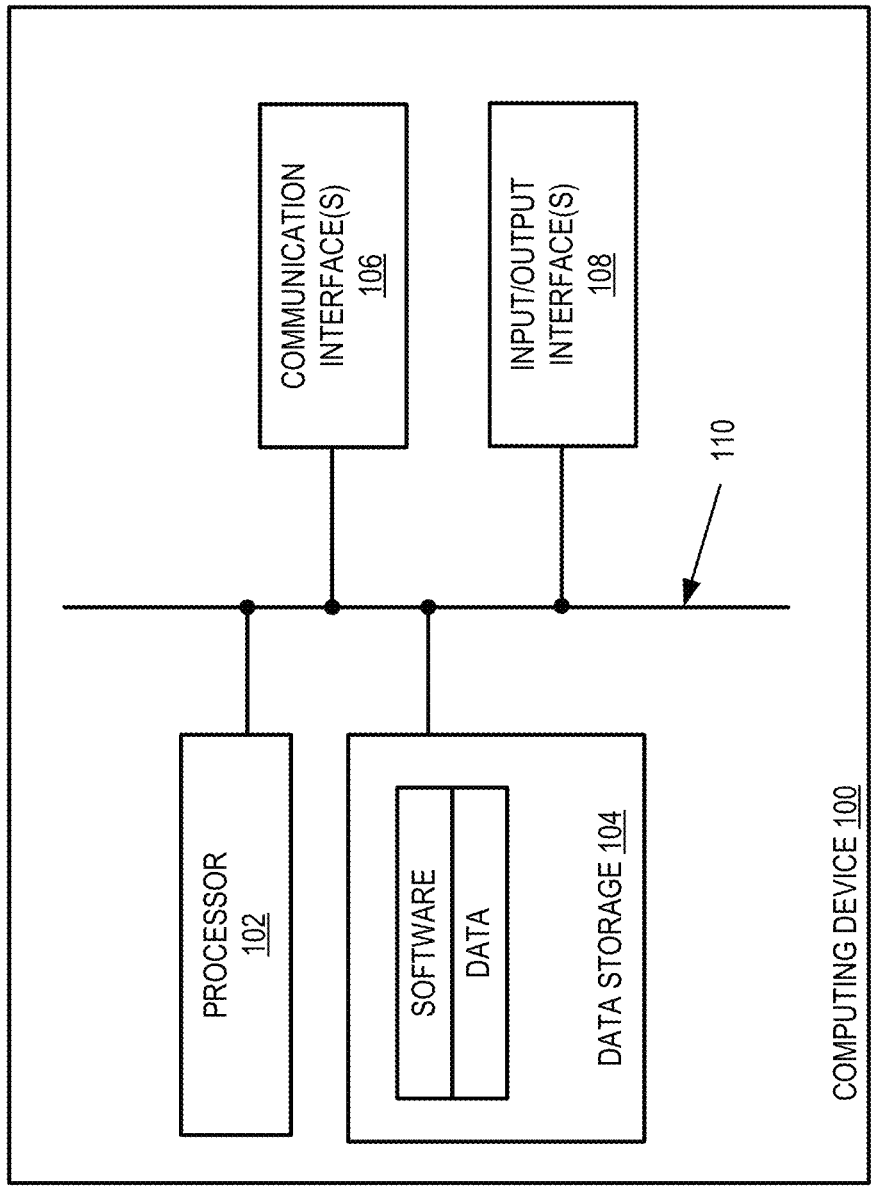
FIG. 1 depicts an example computing device that may be configured to carry out one or more functions of a real-time accent conversion model.

FIG. 1 is a simplified block diagram illustrating some structural components that may be included in an example computing device 100, on which the software technology discussed herein may be implemented. As shown in FIG. 1, the computing device may include one or more processors 102, data storage 104, a communication interface 106, one or more input/output (I/O) interfaces 108, all of which may be communicatively linked by a communication link 110 that may take the form of a system bus, among other possibilities.

The processor 102 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 102 could comprise processing components that are distributed across a plurality of physical computing devices connected via a network, such as a computing cluster of a public, private, or hybrid cloud.

In turn, data storage 104 may comprise one or more non-transitory computer-readable storage mediums that are collectively configured to store (i) software components including program instructions that are executable by processor 102 such that computing device 100 is configured to perform some or all of the disclosed functions and (ii) data that may be received, derived, or otherwise stored, for example, in one or more databases, file systems, or the like, by computing device 100 in connection with the disclosed functions. In this respect, the one or more non-transitory computer-readable storage mediums of data storage 104 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 104 may comprise computer-readable storage mediums that are distributed across a plurality of physical computing devices connected via a network, such as a storage cluster of a public, private, or hybrid cloud. Data storage 104 may take other forms and/or store data in other manners as well.

The communication interface 106 may be configured to facilitate wireless and/or wired communication between the computing device 100 and other systems or devices. As such, communication interface 106 may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities. In some embodiments, the communication interface 106 may include multiple communication interfaces of different types. Other configurations are possible as well.

The I/O interfaces 108 of computing device 100 may be configured to (i) receive or capture information at computing device 100 and/or (ii) output information for presentation to a user. In this respect, the one or more I/O interfaces 108 may include or provide connectivity to input components such as a microphone, a camera, a keyboard, a mouse, a trackpad, a touchscreen, or a stylus, among other possibilities. Similarly, the I/O interfaces 108 may include or provide connectivity to output components such as a display screen and an audio speaker, among other possibilities.

It should be understood that computing device 100 is one example of a computing device that may be used with the embodiments described herein, and may be representative of the computing devices 200 and 300 shown in FIGS. 2-3 and discussed in the examples below. Numerous other arrangements are also possible and contemplated herein. For instance, other example computing devices may include additional components not pictured or include less than all of the pictured components.

II. Example Functionality

Figure 2:
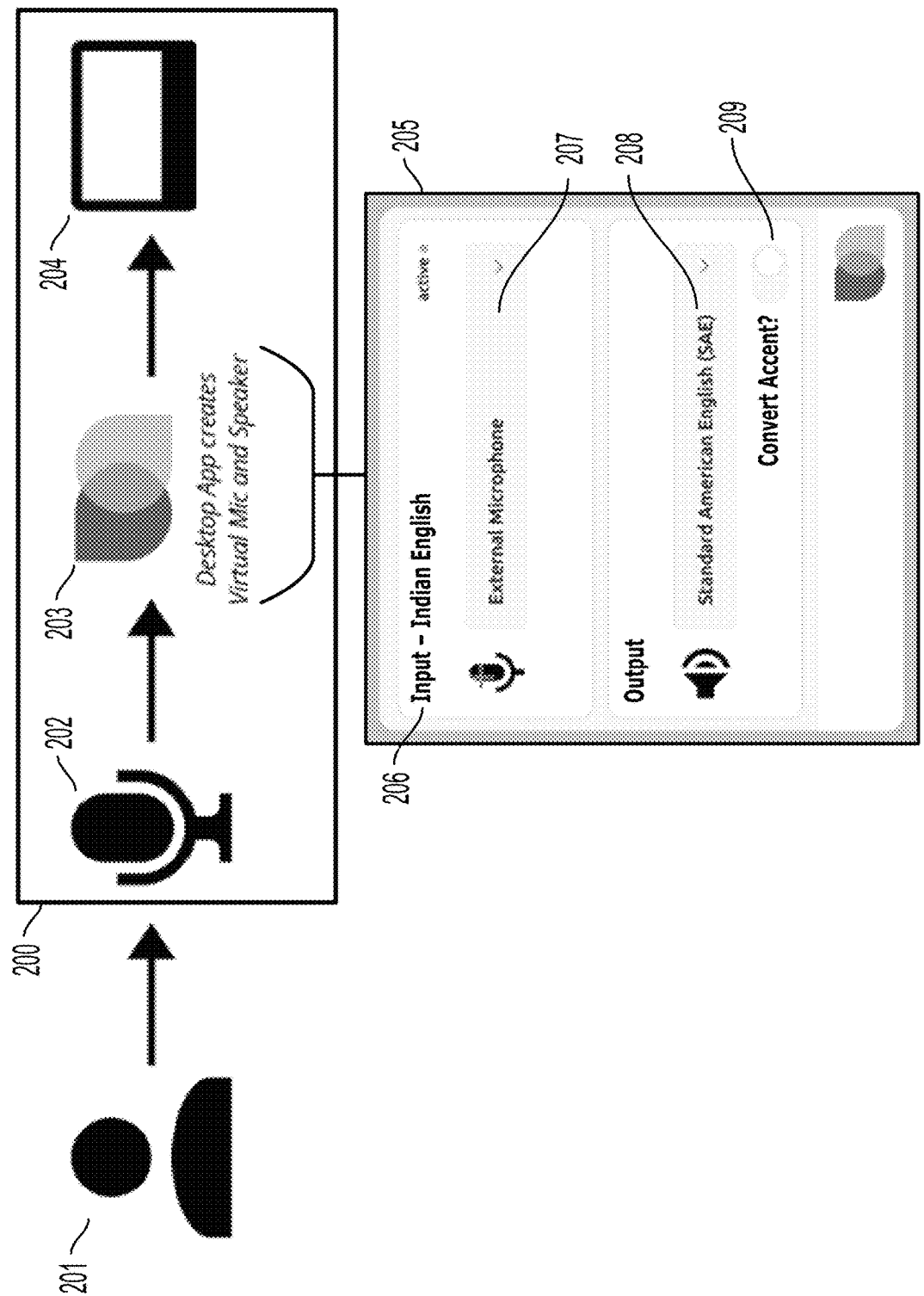
FIG. 2 depicts a simplified block diagram of a computing device configured for real-time accent conversion.

Turning to FIG. 2, a simplified block diagram of a computing device configured for real-time accent conversion is shown. As described above, the disclosed technology is generally directed to a new software application that utilizes machine-learning models to perform real-time accent conversion on input speech that is received by a computing device, such as the computing device 200 shown in FIG. 2. In this regard, the accent-conversion application may be utilized in conjunction with one or more other software applications that are normally used for digital communications.

For example, as shown in FIG. 2, a user 201 of the computing device 200 may provide speech content that is captured by a hardware microphone 202 of the computing device 200. In some embodiments, the hardware microphone 202 shown in FIG. 2 might be an integrated component of the computing device 200 (e.g., the onboard microphone of a laptop computer or smartphone). In other embodiments, the hardware microphone 202 might take the form of a wired or wireless peripheral device (e.g., a webcam, a dedicated hardware microphone) that is connected to an I/O interface of the computing device 200. Other examples are also possible.

The speech content may then be passed to the accent-conversion application 203 shown in FIG. 2. In some implementations, the accent-conversion application 203 may function as a virtual microphone that receives the captured speech content from the hardware microphone 202 of the computing device 200, performs accent conversion as discussed herein, and then routes the converted speech content to a digital communication application 204 (e.g., a digital communication application such as those using the trade names Zoom®, Skype®, Viber®, Telegram®, etc.) that would normally receive input speech content directly from the hardware microphone 202. Advantageously, the accent conversion may be accomplished locally on the computing device 200, which may tend to minimize the latency associated with other applications that may rely on cloud-based computing.

FIG. 2 shows one possible example of a virtual microphone interface 205 that may be presented by the accent-conversion application 203. For example, the virtual microphone interface 205 may provide an indication 206 of the input accent of the user 201, which may be established by the user 201 upon initial installation of the accent-conversion application 203 on computing device 200. As shown in FIG. 2, the virtual microphone interface 205 indicates that the user 201 speaks with an Indian English accent. In some implementations, the input accent may be adjustable to accommodate users with different accents than the user 201.

Further, the virtual microphone interface 205 may include a drop-down menu 207 or similar option for selecting the input source from which the accent-conversion application 203 will receive speech content, as the computing device 200 might have multiple available options to use as an input source. Still further, the virtual microphone interface 205 may include a drop-down menu 208 or similar option for selecting the desired output accent for the speech content. As shown in FIG. 2, the virtual microphone interface 205 indicates that the incoming speech content will be converted to speech having a SAE accent. The converted speech content is then provided to the communication application 204, which may process the converted speech content as if it had come from the hardware microphone 202.

Still further, in some implementations, the virtual microphone interface 205 may include a toggle 209 or similar control that may be used to turn the accent conversion functionality of the accent-conversion application 203 on or off. When the conversion functionality is toggled off, the accent-conversion application 203 may act as a pass-through for the input speech. In this way, the user 201 may avoid the hassle of reconfiguring input devices to remove the virtual microphone for conversations where accent conversion is not needed, allowing the user 201 to easily move between conversations with and without accent conversion engaged.

Advantageously, the accent-conversion application 203 may accomplish the operations above, and discussed in further detail below, at speeds that enable real-time communications, having a latency as low as 50-700 ms (e.g., 200 ms) from the time the input speech received by the accent-conversion application 203 to the time the converted speech content is provided to the communication application 204. Further, the accent-conversion application 203 may process incoming speech content as it is received, making it capable of handling both extended periods of speech as well as frequent stops and starts that may be associated with some conversations. For example, in some embodiments, the accent-conversion application 203 may process incoming speech content every 160 ms. In other embodiments, the accent-conversion application 203 may process the incoming speech content more frequently (e.g., every 80 ms) or less frequently (e.g., every 300 ms).

Figure 3:
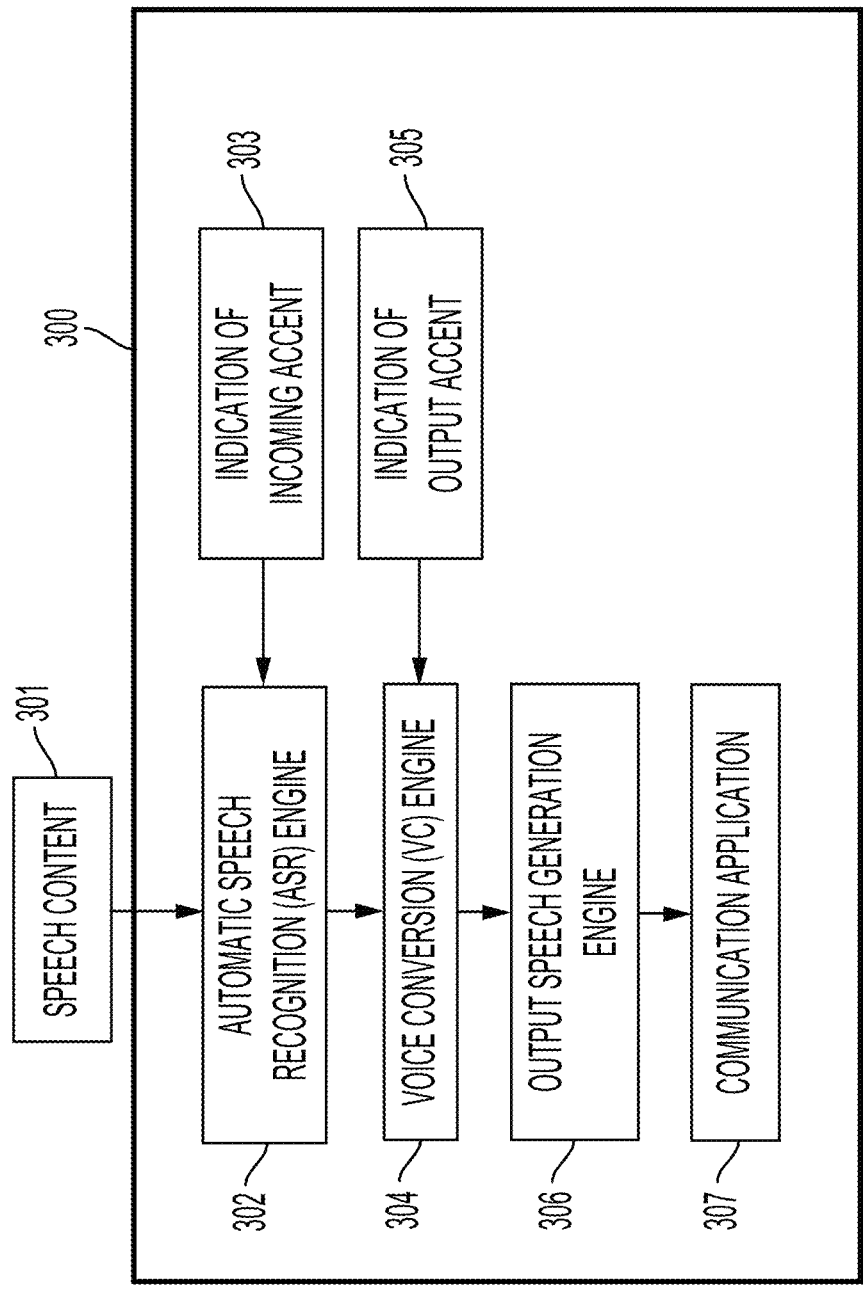
FIG. 3 depicts a simplified block diagram of a computing device and an example data flow pipeline for a real-time accent conversion model.

Turning now to FIG. 3, a simplified block diagram of a computing device 300 and an example data flow pipeline for a real-time accent conversion model are shown. For instance, the computing device 300 may be similar to or the same as the computing device 200 shown in FIG. 2. At a high-level, the components of the real-time accent conversion model that operate on the incoming speech content 301 include (i) an automatic speech recognition (ASR) engine 302, (ii) a voice conversion (VC) engine 304, and (iii) an output speech generation engine 306. As one example, the output speech generation engine may be embodied in a vocoder 306.

FIG. 3 will be discussed in conjunction with FIG. 4, which depicts a flow chart 400 that includes example operations that may be carried out by a computing device, such as the computing device 300 of FIG. 3, to facilitate using a real-time accent conversion model.

At block 402, the computing device 300 may receive speech content 301 having a first accent. For instance, as discussed above with respect to FIG. 2, a user such as user 201 may provide speech content 301 having an Indian English accent, which may be captured by a hardware microphone of the computing device 300. In some implementations, the computing device 300 may engage in pre-processing of the speech content 301, including converting the speech content 301 from an analog signal to a digital signal using an analog-to-digital converter (not shown), and/or down-sampling the speech content 301 to a sample rate (e.g., 16 kHz) that will be used by the ASR engine 302, among other possibilities. In other implementations, one or more of these pre-processing actions may be performed by the ASR engine 302.

The ASR engine 302 includes one or more machine learning models (e.g., a neural network, such as a recurrent neural network (RNN), a transformer neural network, etc.) that may be trained using previously captured speech content from many different speakers having the first accent. Continuing the example above, the ASR engine 302 may be trained with previously captured speech content from a multitude of different speakers, each having an Indian English accent. For instance, the captured speech content used as training data may include transcribed content in which each of the speakers read the same script (e.g., a script curated to provide a wide sampling of speech sounds, as well as specific sounds that are unique to the first accent). Thus, the ASR engine 302 may align and classify each frame of the captured speech content according to its monophone and triphone sounds, as indicated in the corresponding transcript. As a result of this frame-wise breakdown of the captured speech across multiple speakers having the first accent, the ASR engine 302 may develop a learned linguistic representation of speech having an Indian English accent that is not speaker-specific.

On the other hand, the ASR engine 302 may also be used to develop a learned linguistic representation for an output accent that is only based on speech content from a single, representative speaker (e.g., a target SAE speaker) reading a script in the output accent, and therefore is speaker specific. In this way, the synthesized speech content that is generated having the target accent (discussed further below) will tend to sound like the target speaker for the output accent. In some cases, this may simplify the processing required to perform accent conversion and generally reduce latency.

Further, it should be understood that the captured speech content that is used to train the ASR engine 302 does not necessarily need to be limited to captured speech content having the first accent. Rather, the ASR engine 302 discussed herein may be trained using captured speech content having a diversity of accents, which may enable the ASR engine 302 to develop a learned linguistic representation of not only the first accent, but also the second accent as well as additional accents. In this way, the accent-conversion application 203 noted above may utilize a single ASR engine 302 that is capable of receiving and converting speech content having various different input accents.

In some implementations, the speech content collected from the multiple Indian English speakers as well as the target SAE speaker for training the ASR engine 302 may be based on the same script, also known as parallel speech. In this way the transcripts used by the ASR engine 302 to develop a linguistic representation for speech content in both accents are the same, which may facilitate mapping one linguistic representation to the other in some situations. Alternatively, the training data may include non-parallel speech, which may require less training data. Other implementations are also possible, including hybrid parallel and non-parallel approaches.

It should be noted that the learned linguistic representations developed by the ASR engine 302 and discussed herein may not be recognizable as such to a human. Rather, the learned linguistic representations may be encoded as machine-readable data (e.g., a hidden representation) that the ASR engine 302 uses to represent linguistic information.

In practice, the ASR engine 302 may be individually trained with speech content including multiple different accents, across different languages, and may develop a learned linguistic representation for each one. Accordingly, at block 404, the computing device 300 may receive an indication of the Indian English accent associated with the received speech content 301, so that the appropriate linguistic representation is used by the ASR engine 302. As noted above, this indication of the incoming accent, shown by way of example as block 303 in FIG. 3, may be established at the time the accent-conversion application is installed on the computing device 300 and might not be changed thereafter. As another possibility, the accent-conversion application may be adjusted to indicate a different incoming accent, such that the ASR engine 302 uses a different learned linguistic representation to analyze the incoming speech content 301.

At block 406, the ASR engine 302 may derive a linguistic representation of the received speech content 301, based on the learned linguistic representation the ASR engine 302 has developed for the Indian English accent. For instance, the ASR engine 302 may break down the received speech content 301 by frame and classify each frame according to the sounds (e.g., monophones and triphones) that are detected, and according to how those particular sounds are represented and inter-related in the learned linguistic representation associated with an Indian English accent.

In this way, the ASR engine 302 functions to deconstruct the received speech content 301 having the first accent into a derived linguistic representation with very low latency. In this regard, it should be noted that the ASR engine 302 may differ from some other speech recognition models that are configured predict and generate output speech, such as a speech-to-text model. Accordingly, the ASR engine 302 may not need to include such functionality.

The derived linguistic representation of the received speech content 301 may then be passed to the VC engine 304. Similar to the indication of the incoming accent 303, the computing device 300 may also receive an indication of the output accent, shown by way of example as block 305 in FIG. 3, so that the VC engine 304 can apply the appropriate mapping and conversion from the incoming accent to the output accent. For instance, the indication of the output accent may be received based on a user selection from a menu, such as the virtual microphone interface 205 shown in FIG. 2, prior to receiving the speech content 301 having the first accent.

Similar to the ASR engine 302, the VC engine 304 includes one or more machine learning models (e.g., a neural network) that use the learned linguistic representations developed by the ASR engine 302 as training inputs to learn how to map speech content from one accent to another. For instance, the VC engine 304 may be trained to map an ASR-based linguistic representation of Indian English speech to an ASR-based linguistic representation of a target SAE speaker. In training the VC engine 304, it is necessary to align the Indian English speech to the SAE speech during this mapping. One possible way to accomplish this is by using individual monophones and/or triphones within the training data as a possible heuristic to better determine the alignments. Like the learned linguistic representations themselves, the learned mapping between the two representations may be encoded as machine-readable data (e.g., a hidden representation) that the VC engine 304 uses to represent linguistic information.

Accordingly, at block 408, the VC engine 304 may utilize the learned mapping between the two linguistic representations to synthesize, based on the derived linguistic representation of the received speech content 301, audio data that is representative of the speech content 301 having the second accent. The audio data that is synthesized in this way may take the form of a set of mel spectrograms. For example, the VC engine 304 may map each incoming frame in the derived linguistic representation to an outgoing target speech frame.

In this way, the VC engine 304 functions to reconstruct acoustic features from the derived linguistic representation into audio data that is representative of speech by a different speaker having the second accent, all with very low latency. Advantageously, because the VC engine 304 works at the level of encoded linguistic data and does not need to predict and generate output speech as a midpoint for the conversion, it can function more quickly than alternatives such as a STT-TTS approach. Further, the VC engine 304 may more accurately capture some of the nuances of voice communications, such as brief pauses or changes in pitch, prosody, or the emotion of the speaker, all of which can convey important information and which may be lost if the speech content were converted to text first and then back to speech.

At block 410, the output speech generation engine 306 may convert the synthesized audio data into output speech, which may be a synthesized version of the received speech content 301 having the second accent. As noted above, the output speech may further have the voice identity of the target speaker whose speech content, having the second accent, was used to train the ASR engine 302. In some examples, the output speech generation engine 306 may take the form of a vocoder 306 or similar component that can rapidly process audio under the real-time conditions contemplated herein. The output speech generation engine 306 may include one or more additional machine learning algorithms (e.g., a neural network, such as a generative adversarial network, one or more Griffin-Lim algorithms, etc.) that learn to convert the synthesized audio data into waveforms that are able to be heard. Other examples are also possible.

As shown in FIG. 3, the output speech generation engine 306 may pass the output speech to a communication application 307 operating on the computing device 300. The communication application 307 may then transmit the output speech to one or more other computing devices, cause the computing device 300 to play back the output speech via one or more speakers, and/or store the output speech as an audio data file, among numerous other possibilities.

Although the examples discussed above involve a computing device 300 that utilizes the accent-conversation application for outgoing speech (e.g., situations where the user of computing device 300 is the speaker), it is also contemplated that the accent-conversion application may be used by the computing device 300 in the opposite direction as well, for incoming speech content where the user is a listener. For instance, rather than being situated as a virtual microphone between a hardware microphone and the communication application 307, the accent-conversion application may be deployed as a virtual speaker between the communication application 307 and a hardware speaker of the computing device 300, and the indication of the incoming accent 303 and the indication of the output accent 305 shown in FIG. 3 may be swapped. In some cases, these two pipelines may run in parallel such that a single installation of the accent-conversion application is performing two-way accent conversion between users. In the context of the example discussed above, this arrangement may allow the Indian English speaker, whose outgoing speech is being converted to an SAE accent, to also hear the SAE speaker's responses in Indian English accented speech (e.g., synthesized speech of a target Indian English speaker).

As a further extension, the examples discussed above involve an ASR engine 302 that is provided with an indication of the incoming accent. However, in some embodiments it may be possible to use the accent-conversion application discussed above in conjunction with an accent detection model, such that the computing device 300 is initially unaware of one or both accents that may be present in a given communication. For example, an accent detection model may be used in the initial moments of a conversation to identify the accents of the speakers. Based on the identified accents, the accent-conversion application may determine the appropriate learned linguistic representation(s) that should be used by the ASR engine 302 and the corresponding learned mapping between representations that should be used by the VC engine 304. Additionally, or alternatively, the accent detection model may be used to provide a suggestion to a user for which input/output accent the user should select to obtain the best results. Other implementations incorporating an accent detection model are also possible.

Figure 4:
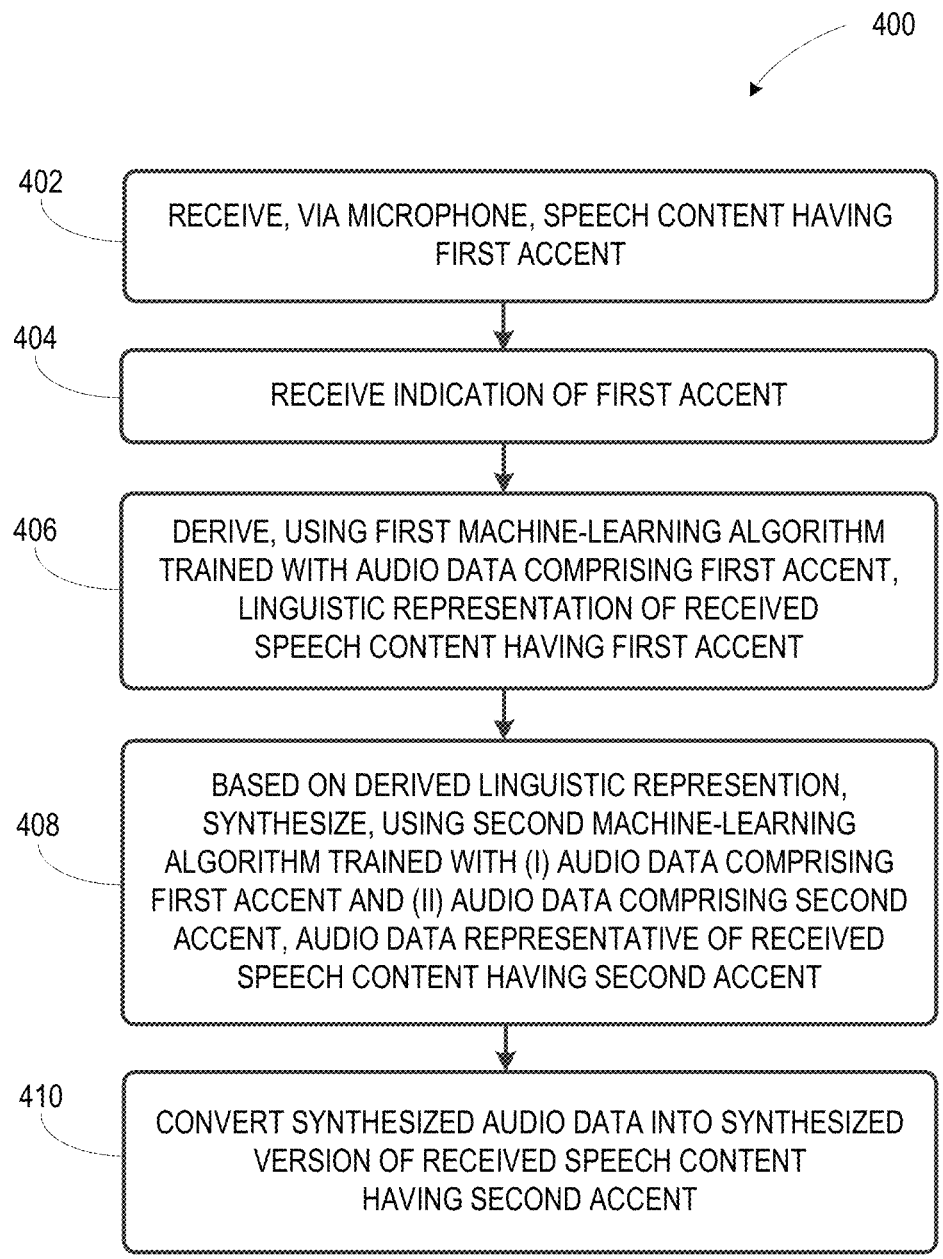
FIG. 4 depicts an example flow chart that may be carried out to facilitate using a real-time accent conversion model.

FIG. 4 includes one or more operations, functions, or actions as illustrated by one or more of blocks 402-410, respectively. Although the blocks are illustrated in sequential order, some of the blocks may also be performed in parallel, and/or in a different order than those described herein. Also, the various blocks may be combined into fewer blocks, divided into additional blocks, and/or removed based upon the desired implementation.

In addition, for the example flow chart in FIG. 4 and other processes and methods disclosed herein, the flow chart shows functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random-Access Memory (RAM). The computer readable medium may also include non-transitory media, such as secondary or persistent long-term storage, like read only memory (ROM), optical or magnetic disks, compact disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIG. 4 may represent circuitry and/or machinery that is wired or arranged to perform the specific functions in the process.

III. Conclusion

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. Claims should not be construed as requiring action by such actors unless explicitly recited in claim language.

We claim:

1. A system, comprising:
at least one processor; and
non-transitory computer-readable medium comprising program instructions stored thereon that are executable by the at least one processor to cause the system to:
train a first machine-learning algorithm with first audio data comprising speech content captured from a plurality of different speakers having a first accent, wherein the training comprises aligning and classifying each of a first plurality of frames of the captured speech content corresponding to respective ones of the plurality of different speakers;
apply the first machine-learning algorithm to speech content received via at least one microphone, and comprising a set of phonemes associated with a first pronunciation of the received speech content, to derive a non-text linguistic representation of the set of phonemes associated with the first pronunciation of the received speech content;
based on the derived non-text linguistic representation of the set of phonemes associated with the first pronunciation of the received speech content, synthesize, using a second machine-learning-algorithm trained with (i) second audio data comprising the first accent and (ii) third audio data comprising a second accent, fourth audio data representative of the received speech content having the second accent, wherein synthesizing the fourth audio data comprises mapping at least a first non-text linguistic representation of a first phoneme of the set of phonemes associated with the first pronunciation of the received speech content to a second non-text linguistic representation of a second phoneme of an updated set of phonemes associated with a second pronunciation of the received speech content that is different from the first pronunciation of the received speech content, wherein the first and second phonemes are different phonemes; and
convert the synthesized fourth audio data into a synthesized version of the received speech content having the second accent, wherein the synthesized version of the received speech content having the second accent comprises the updated set of phonemes associated with the second pronunciation of the received speech content.

2. The system of claim 1, wherein the program instructions are executable by the at least one processor to further cause the system to apply, to the derived non-text linguistic representation of the received speech content having the first accent, a learned mapping between the second audio data comprising the first accent and the third audio data comprising the second accent.

3. The system of claim 1, wherein the program instructions are executable by the at least one processor to further cause the system to map each frame in the non-text linguistic representation of the set of phonemes associated with the first pronunciation of the received speech content to a corresponding frame in the non-text linguistic representation of the updated set of phonemes associated with the second pronunciation of the received speech content in order to map the non-text linguistic representation of the set of phonemes associated with the first pronunciation of the received speech content to the non-text linguistic representation of the updated set of phonemes associated with the second pronunciation of the received speech content.

4. The system of claim 1, wherein the second audio data comprising the first accent corresponds to a plurality of speakers having the first accent.

5. The system of claim 1, wherein the third audio data comprising the second accent corresponds to a single speaker having the second accent.

6. The system of claim 1, wherein the program instructions are executable by the at least one processor to further cause the system to receive a first user input indicating a selection of the first accent and a second user input indicating a selection of the second accent.

7. The system of claim 1, wherein the first machine-learning algorithm comprises a non-text learned linguistic representation for the first accent and the program instructions are executable by the at least one processor to further cause the system to:
 align and classify each of the first plurality of frames according to monophone and triphone sounds of the captured speech content to train the first machine-learning algorithm; and
 determine, for each of a second plurality of frames in the received speech content, a respective (i) monophone and (ii) triphone sound detected in the frame based on the non-text learned linguistic representation for the first accent.

8. The system of claim 1, wherein the program instructions are executable by the at least one processor to further cause the system to transmit the synthesized version of the received speech content having the second accent to a second computing device.

9. The system of claim 1, wherein the program instructions are executable by the at least one processor to further cause the system to:
 receive, in real time, continuous speech content having the first accent; and
 continuously convert the synthesized fourth audio data into a synthesized version of the continuous speech content having the second accent between 50-700 ms after receiving the continuous speech content having the first accent.

10. The system of claim 1, wherein the received speech content having the first accent further comprises a set of prosodic features, the program instructions are executable by the at least one processor to further cause the system to synthesize the fourth audio data representative of the received speech content having the second accent and the set of prosodic features, and the synthesized version of the received speech content having the second accent has the set of prosodic features.

11. A non-transitory computer-readable medium provisioned with program instructions that, when executed by at least one processor of a computing device, cause the computing device to:
 train a first machine-learning algorithm with first audio data comprising speech content captured from a plurality of different speakers having a first accent, wherein the training comprises aligning and classifying each of a first plurality of frames of the captured speech content corresponding to respective ones of the plurality of different speakers;
 apply the first machine-learning algorithm to speech content received via at least one microphone, and comprising a set of phonemes associated with a first pronunciation of the received speech content, to derive a non-text linguistic representation of the set of phonemes associated with the first pronunciation of the received speech content;
 based on the derived non-text linguistic representation of the set of phonemes associated with the first pronunciation of the received speech content, synthesize, using a second machine-learning-algorithm trained with (i) second audio data comprising the first accent and (ii) third audio data comprising a second accent, fourth audio data representative of the received speech content having the second accent, wherein synthesizing the fourth audio data comprises mapping at least a first non-text linguistic representation of a first phoneme of the set of phonemes associated with the first pronunciation of the received speech content to a second non-text linguistic representation of a second phoneme of an updated set of phonemes associated with a second pronunciation of the received speech content that is different from the first pronunciation of the received speech content, wherein the first and second phonemes are different phonemes; and
 convert the synthesized fourth audio data into a synthesized version of the received speech content having the second accent, wherein the synthesized version of the received speech content having the second accent comprises the updated set of phonemes associated with the second pronunciation of the received speech content.

12. The non-transitory computer-readable medium of claim 11, wherein the program instructions, when executed by the at least one processor, further cause the computing device to apply, to the derived non-text linguistic representation of the received speech content having the first accent, a learned mapping between the second audio data comprising the first accent and the third audio data comprising the second accent.

13. The non-transitory computer-readable medium of claim 11, wherein the program instructions, when executed by the at least one processor, further cause the computing device to map each frame in the non-text linguistic representation of the set of phonemes associated with the first pronunciation of the received speech content to a corresponding frame in the non-text linguistic representation of the updated set of phonemes associated with the second pronunciation of the received speech content in order to map the non-text linguistic representation of the set of phonemes associated with the first pronunciation of the received speech content to the non-text linguistic representation of the updated set of phonemes associated with the second pronunciation of the received speech content.

14. The non-transitory computer-readable medium of claim 11, wherein one or more of the second audio data comprising the first accent corresponds to a plurality of speakers having the first accent or the third audio data comprising the second accent corresponds to a single speaker having the second accent.

15. The non-transitory computer-readable medium of claim 11, wherein the program instructions, when executed by the at least one processor, further cause the computing device to receive a first user input indicating a selection of the first accent and a second user input indicating a selection of the second accent.

16. The non-transitory computer-readable medium of claim 11, wherein the first machine-learning algorithm comprises a non-text learned linguistic representation for the first accent and the program instructions, when executed by the at least one processor, further cause the computing device to:

align and classify each of the first plurality of frames according to monophone and triphone sounds of the captured speech content to train the first machine-learning algorithm; and determine, for each of a second plurality of frames in the received speech content, a respective (i) monophone and (ii) triphone sound detected in the frame based on the non-text learned linguistic representation for the first accent.

17. The non-transitory computer-readable medium of claim 11, wherein the program instructions, when executed by the at least one processor, further cause the computing device to transmit the synthesized version of the received speech content having the second accent to a second computing device.

18. The non-transitory computer-readable medium of claim 11, wherein the program instructions, when executed by the at least one processor, further cause the computing device to:

receive, in real time, continuous speech content having the first accent; and continuously convert the synthesized fourth audio data into a synthesized version of the continuous speech content having the second accent between 50-700 ms after receiving the continuous speech content having the first accent.

19. A method comprising:

training a first machine-learning algorithm with first audio data comprising speech content captured from a plurality of different speakers having a first accent, wherein the training comprises aligning and classifying each of a first plurality of frames of the captured speech content corresponding to respective ones of the plurality of different speakers;

applying the first machine-learning algorithm to speech content received via at least one microphone, and comprising a set of phonemes associated with a first pronunciation of the received speech content, to derive a non-text linguistic representation of the set of phonemes associated with the first pronunciation of the received speech content;

based on the derived non-text linguistic representation of the set of phonemes associated with the first pronunciation of the received speech content, synthesizing, using a second machine-learning-algorithm trained with (i) second audio data comprising the first accent and (ii) third audio data comprising a second accent, fourth audio data representative of the received speech content having the second accent, wherein synthesizing the fourth audio data comprises mapping at least a first non-text linguistic representation of a first phoneme of the set of phonemes associated with the first pronunciation of the received speech content to a second non-text linguistic representation of a second phoneme of an updated set of phonemes associated with a second pronunciation of the received speech content that is different from the first pronunciation of the received speech content, wherein the first and second phonemes are different phonemes; and converting the synthesized fourth audio data into a synthesized version of the received speech content having the second accent, wherein the synthesized version of the received speech content having the second accent comprises the updated set of phonemes associated with the second pronunciation of the received speech content.

20. The method of claim 19, further comprising:

receiving, in real time, continuous speech content having the first accent; and continuously converting the synthesized fourth audio data into a synthesized version of the continuous speech content having the second accent between 50-700 ms after receiving the continuous speech content having the first accent.

21. The method of claim 19, further comprising mapping each frame in the non-text linguistic representation of the set of phonemes associated with the first pronunciation of the received speech content to a corresponding frame in the non-text linguistic representation of the updated set of phonemes associated with the second pronunciation of the received speech content in order to map the non-text linguistic representation of the set of phonemes associated with the first pronunciation of the received speech content to the non-text linguistic representation of the updated set of phonemes associated with the second pronunciation of the received speech content.

22. The method of claim 19, wherein the first machine-learning algorithm comprises a non-text learned linguistic representation for the first accent and the method further comprises:

aligning and classifying each of the first plurality of frames according to monophone and triphone sounds of the captured speech content to train the first machine-learning algorithm; and determining, for each of a second plurality of frames in the received speech content, a respective (i) monophone and (ii) triphone sound detected in the frame based on the non-text learned linguistic representation for the first accent.

* * * * *